Patented Feb. 19, 1946

2,395,058

UNITED STATES PATENT OFFICE 2,395,058

PRODUCTION OF BUTADIENE

William J. Mattox, Chicago, Ill., assignor to Universal Oil Products Company, Chicago, Ill., a corporation of Delaware No Drawing. Application February 11, 1942, Serial No. 430,499

9 Claims. (Cl. 260—680)

This invention relates to a process for the production of butadiene by the catalytic dehydrogenation of normal butenes either alone or in admixture with normal butane. It is broadly directed to the dehydrogenation of hydrocarbons to substances having the same number of carbon atoms per molecule, such as naphthenes to aromatics, paraffins to olefins, and olefins to diolefins. It is also applicable to the dehydrogenation of hydrocarbons containing six carbon atoms, in which case substantial quantities of aromatic hydrocarbons are formed by the cyclization of the open chain compounds.

In a more specific sense the invention is concerned with dehydrogenation reactions involving composite catalysts prepared by new and improved methods which result in the formation of catalysts having a high degree of selectivity in the promotion of the desired chemical reactions with the formation of a minimum quantity of undesirable by-products.

The composite catalysts employed in the process of my invention comprise aluminum oxide and a dehydrogenating oxide, such as the oxide of a metal of the left hand column of group VI of the periodic table, such as chromium or molybdenum or a metal of the left hand column of group V of the periodic table, particularly vanadium.

The catalysts employed in the process of my invention are particularly adaptable to the manufacture of diolefins from mono-olefins which are related to the synthetic rubber problem, in that such diolefins as butadiene may be readily copolymerized with styrene or acrylonitrile to form polymers of high molecular weight, having properties closely resembling those of natural rubber.

In one specific embodiment, my invention comprises a process for the production of butadiene which comprises subjecting a normal $C_4$ hydrocarbon of higher hydrogen content to the action of a composite catalyst prepared by fusing hydrated aluminum sulfate with a compound of a metal whose oxide has dehydrogenating properties, the composite catalyst mass after fusion being dehydrated, calcined, and reduced to convert the aluminum sulfate to aluminum oxide, the temperature at which the normal $C_4$ hydrocarbon is contacted with the compounded catalyst lying within the approximate limits of 500 to 700° C., the pressure being less than about 0.25 atmosphere. The following examples illustrate the results obtainable in producing the process of my invention:

Example I 20.0 grams of chromium trioxide are dissolved in 50 cc. of warm water and added to 500 grams of $Al_2(SO_4)_3.18H_2O$ dissolved in 175 cc. of hot water. This solution is evaporated to approximately one-third of the original volume and then dried in an oven for 6 hours at 300° C. The resulting dehydrated catalyst is then ground to pass a 30 mesh sieve, formed into 1/8" pellets using 4% of Sterotex as a lubricant, and reduced slowly with hydrogen at a temperature of 500° C., until no further $SO_2$ or $H_2S$ is formed. This catalyst is then placed in a stainless steel reaction tube, heated to a temperature of 625° C., and a mixture of normal butane and normal butenes, comprising 75 mol. percent of normal butane and 25 mol. percent of normal butenes, thereafter passed through the bed of catalyst. When operating at a pressure of about 80 mm. of mercury and a charging rate corresponding to 400 volumes of charging stock measured at standard conditions of temperature and pressure per hour per unit volume of catalyst, the resulting mixture may contain 16% butadiene in the condensible gas.

Example II 6 grams of ammonium vanadate ($NH_4VO_3$) are dissolved in 100 cc. of warm water and added to 500 grams of $Al_2(SO_4)_3.18H_2O$ dissolved in 175 cc. of water. This solution is evaporated to a pasty mass and then placed in an oven and dried for 5 hours at 325° C. The dried mass is then ground to pass a 30 mesh sieve, thoroughly mixed with 3% Sterotex as a lubricant, and then formed into pills having an average diameter of 1/8". The pills are then treated with a stream of hydrogen at a temperature of 550° C. until no further $SO_2$ or $H_2S$ is formed. The catalyst is then placed in a stainless steel tube, heated to a temperature of 615° C. and a mixture of normal butane and butenes comprising 60 mol. percent of normal butane and 40 mol. percent of normal butenes under pressure of 75 mm. of mercury passed through the catalyst at a space velocity corresponding to 400 volumes of charging stock measured at standard conditions of temperature and pressure per hour per unit volume of catalyst. The reaction products after removal of hydrogen contain about 21 mol. percent of butadiene.

In addition to aluminum sulfate, other aluminum salts, such as aluminum ammonium sulfate, may be used. When using aluminum sulfate the dried composite catalyst mass is reduced with a stream of hydrogen or a hydrogen containing gas, such as illuminating gas, to decompose the sulfate, the sulfur being liberated in the form of sulfur dioxide and hydrogen sulfide. The above mentioned aluminum salts are readily decomposable to the oxide when a temperature above about 400° C. is used in the reducing step.

The dehydrogenating metal oxide may be supplied to the solution of the aluminum salt in the form of an ammonium salt, metal sulfates, or other soluble salts. Chromium oxide may be obtained by the decomposition of ammonium dichromate and similarly, molybdenum oxide and vanadium oxide may be obtained by the decomposition of ammonium molybdate and ammonium vanadate respectively. If desired, chromium nitrate, chromium sulfate, or chromic acid could be used as a source of chromium oxide. Vanadium oxide could also be obtained by adding vanadic acid to the solution of aluminum salt. A stabilizing oxide, such as zinc oxide or magnesia, may be added to the liquid mass before evaporation to dryness.

The composite catalyst may be employed in the form of granules obtained by crushing and sizing the calcined mass. If desired, the dried mass may be ground to pass a 30 or 50 mesh sieve, mixed with a lubricant, and then formed into pills of the desired size. When the catalyst is used in the form of pellets or granules the reactions may be readily conducted by using the catalyst as a filler in the reaction tube through which the reactants in the vapor state are passed.

The catalyst prepared by the methods hereinbefore set forth is characterized by the stability toward high temperatures thus permitting its regeneration in a shorter period of time. This increased heat stability of the catalyst also permits a higher temperature in the regeneration process, which is of particular advantage when the catalyst is employed in the powdered state, in which method of operation a substantial portion or all of the heat necessary for the endothermic process of dehydrogenation may be supplied by the hot catalyst powder. This increased heat stability of the catalyst may be taken advantage of in another way. If desired, the temperature of regeneration may be maintained as heretofore, in which case the catalyst has, owing to this thermal stability at high temperature, a longer period of usefulness before it must be replaced by fresh catalyst.

The catalyst prepared by the methods of the present invention also have the advantage in that they are more highly selective in promoting scission of the carbon to hydrogen bonds, thus avoiding side reactions which not only decrease the ultimate yields of the desirable products but also cause the deposition of carbonaceous materials on the catalyst. It is thus evident that owing to the formation of less carbon a longer processing period be employed before the regeneration step is necessary, thus increasing the economy of the process.

The present methods of catalyst preparation also have the advantage in that they are quite simple compared to the methods heretofore employed, which involved chemical precipitation followed by the steps of washing, drying, etc.

Owing to the highly endothermic nature of the reactions for the dehydrogenation of normal butenes or normal butane, adiabatic reaction chambers are, in general, not satisfactory. The process is readily adapted to the use of a powdered catalyst, in which case part or all of the heat necessary for the chemical reaction may be supplied by the hot catalyst powder. In such a method of operation the catalyst powder is maintained in the form of a relatively dense mass in the reaction chamber through which the reactants are passed in a heated vapor state under conditions of temperature, pressure, and contact time adequate to obtain the desired results. The catalyst powder becomes contaminated owing to the deposition of carbon, which reduces the activity and which must be removed in order to permit continuous operation. The contaminated catalyst powder is flowed continuously from the reactor to a regenerator wherein an oxygen containing gas is passed through a relatively dense mass of said powder at a temperature sufficiently high to oxidize the carbonaceous deposits. The process of regeneration may be conveniently conducted at a temperature somewhat above that of the conversion temperature, in which case the catalyst being at a higher temperature than that necessary for the dehydrogenation reactions is able to supply a portion or all of the heat necessary for the endothermic process. In the case that the amount of carbon deposited on the catalyst is not sufficient to raise the catalyst to the desired temperature, an extraneous fuel may be supplied to the regeneration zone to supply the additional quantity of heat.

I claim as my invention:

1. A process for the production of butadiene which comprises subjecting a mixture of normal butane and normal butenes to the action of a composite of aluminum oxide and chromium oxide at a temperature which may vary from about 500° C. to about 700° C. and under subatmospheric pressures and for a period of time adequate to convert at least 10% of the hydrocarbons into butadiene, the aforesaid catalyst composite having been prepared by fusing hydrated aluminum sulfate with an oxide of chromium, said fused mass thereafter being dehydrated, calcined, and reduced in the presence of hydrogen so as to convert the aluminum sulfate into aluminum oxide.

2. A process for catalytically dehydrogenating hydrocarbons which comprises subjecting a hydrocarbon under dehydrogenating conditions to the action of a composite consisting essentially of alumina and at least one other metal oxide having dehydrogenating properties, said composite being prepared by fusing hydrated aluminum sulfate with a compound of a metal whose oxide has dehydrogenating properties, and converting the resultant fused mixture to said composite by calcining, and reducing in the presence of a hydrogen-containing gas.

3. A process for the production of butadiene which comprises catalytically dehydrogenating a normal $C_4$ hydrocarbon of higher hydrogen content than butadiene in the presence of a composite consisting essentially of alumina and at least one other metal oxide having dehydrogenating properties, said composite being prepared by fusing hydrated aluminum sulfate with a compound of a metal whose oxide possesses dehydrogenating properties and converting the resultant fused mixture to said composite by calcining, and reducing in the presence of a hydrogen-containing gas.

4. The process of claim 3 wherein said compound consists of a metal oxide having dehydrogenating properties.

5. The process of claim 3 wherein said compound consists of an oxide of an element from the left-hand column of group VI of the periodic table.

6. The process of claim 3 wherein said compound consists of chromium oxide.

7. The process of claim 3 wherein the dehydrogenation reaction is effected at a temperature of from about 500° C. to about 700° C. and at a pressure of less than about 0.25 atmospheres.

8. The process of claim 3 wherein said reducing step is conducted at a temperature above about 400° C.

9. A process for dehydrogenating hydrocarbons which comprises subjecting a hydrocarbon to the action of a composite of aluminum oxide and chromium oxide at dehydrogenating conditions, the aforesaid catalyst composite having been prepared by fusing hydrated aluminum sulfate with an oxide of chromium, said fused mass thereafter being dehydrated, calcined, and reduced in the presence of hydrogen so as to convert the aluminum sulfate into aluminum oxide.

WILLIAM J. MATTOX.